United States Patent
Verbandt et al.

(10) Patent No.: US 9,130,955 B2
(45) Date of Patent: Sep. 8, 2015

(54) METHOD, APPARATUS AND SYSTEM FOR REGISTERING A TERMINAL WITH AN APPLICATION SERVER IN AN IMS

(75) Inventors: Hugo Verbandt, Merksem (BE); Luc T'syen, Herselt (BE)

(73) Assignee: Alcatel Lucent, Boulogne-Billancourt (FR)

( * ) Notice: Subject to any disclaimer, the term of this patent is extended or adjusted under 35 U.S.C. 154(b) by 775 days.

(21) Appl. No.: 12/457,628

(22) Filed: Jun. 17, 2009

(65) Prior Publication Data

US 2009/0319641 A1   Dec. 24, 2009

(51) Int. Cl.
| | |
|---|---|
| *G06F 15/177* | (2006.01) |
| *G06N 5/02* | (2006.01) |
| *H04L 29/06* | (2006.01) |
| *H04L 29/08* | (2006.01) |
| *H04L 29/14* | (2006.01) |

(52) U.S. Cl.
CPC ........ *H04L 65/1016* (2013.01); *H04L 65/1063* (2013.01); *H04L 65/1073* (2013.01); *H04L 67/101* (2013.01); *H04L 67/1002* (2013.01); *H04L 67/1008* (2013.01); *H04L 67/1034* (2013.01); *H04L 69/40* (2013.01)

(58) Field of Classification Search
USPC ....................................................... 709/220
See application file for complete search history.

(56) References Cited

U.S. PATENT DOCUMENTS

| | | | |
|---|---|---|---|
| 2005/0155036 A1* | 7/2005 | Tiainen et al. ................. | 719/310 |
| 2007/0027975 A1* | 2/2007 | Tai et al. ......................... | 709/223 |
| 2007/0047571 A1* | 3/2007 | Kandikonda et al. .......... | 370/449 |
| 2007/0254681 A1* | 11/2007 | Horvath et al. ................ | 455/466 |
| 2008/0175157 A1* | 7/2008 | Lim et al. ....................... | 370/242 |
| 2009/0097398 A1* | 4/2009 | Belinchon Vergara et al. .............................. | 370/216 |
| 2009/0191873 A1* | 7/2009 | Siegel et al. ................ | 455/435.2 |

FOREIGN PATENT DOCUMENTS

| | | |
|---|---|---|
| EP | 1 838 068 | 9/2007 |
| EP | 1838068 A2 * | 9/2007 |

* cited by examiner

*Primary Examiner* — Lynn Feild
*Assistant Examiner* — Natisha Cox
(74) *Attorney, Agent, or Firm* — Harness, Dickey & Pierce, P.L.C.

(57) ABSTRACT

Method for registering a terminal with an application server being a member of a pool of available application servers in an IP Multimedia Subsystem, IMS, interconnected through a network, for providing services to the terminal, the method comprising: receiving a registration request from the terminal, selecting in accordance with a predefined set of rules comprising at least two rules, an application server for servicing a requested service to the terminal; and registering the terminal with the selected application server.

7 Claims, 3 Drawing Sheets

METHOD, APPARATUS AND SYSTEM FOR REGISTERING A TERMINAL WITH AN APPLICATION SERVER IN AN IMS

The present invention relates to a method for registering a terminal with an application server in an IP Multimedia Subsystem.

The present invention relates further to an apparatus for registering a terminal with an application server in an IP Multimedia Subsystem.

Furthermore, the present invention relates to a system for registering a terminal with an application server in an IP Multimedia Subsystem.

An IP Multimedia Subsystem (IMS) enables providing, over a communication network, multimedia services to terminals. (Originally mobile terminals, but nowadays also terminals in a fixed communication network, and networks with discrete mobility.) A terminal registers with the IMS, whereafter the terminal is able to request multimedia services. The multimedia services are provided by application servers. The IMS registers a terminal with an application server, which application server provides a requested service to the terminal. Multiple application servers may provide services to the same terminal at the same moment.

The terminal is registered with an application server at the moment the user registers with the IMS. In the prior art the terminal's registration request arrives at a serving Call Session Control Function (CSCF), more specifically through an Interrogating-CSCF (I-CSCF). The identification provided by the terminal is looked up in the Home Subscriber Server (HSS) of the network. The HSS confirms that the identification of the terminal is valid. Subsequently, the I-CSCF sends a registration request for the terminal to a Serving-CSCF (S-CSCF). The S-CSCF acquires from the HSS a user profile identified by the identification sent by the terminal. The user profile comprises a definition of the application server which is to be used to serve the terminal. This definition takes the form of a Uniform Resource Identifier (URI). The S-CSCF resolves the URI against a Domain Name System (DNS) to obtain a host address for the application server. Finally, the S-CSCF sends a registration request for the terminal to the application server, that handles the registration further after which the services of the application server become available to the terminal.

The prior art is described above has the drawback that upon the application server becoming unavailable, the application will be unavailable for quite some time. To bring the application back up, the user is required to re-register, which might take minutes or even hours.

The object of the present invention is to provide a method to minimize the period of unavailability of the application.

The present invention meets this object by providing a method for registering a terminal with an application server being a member of a pool of available application servers in an IP Multimedia Subsystem, IMS, interconnected through a network, for providing services to the terminal, the method comprising: receiving a registration request from the terminal, selecting in accordance with a predefined set of rules comprising at least two rules, an application server for servicing a requested service to the terminal; and registering the terminal with the selected application server. A terminal in the mobile network connected to the IMS, registers with the IMS in order to be able to request multimedia services from the IMS. Upon receiving the registration request from the terminal the IMS selects an application server for servicing service requests from the terminal. The selection of the application server is done based on a predefined set of rules. Example rules include selecting an application server based on the user type (for example subscribing user or prepaid user), selecting a server based on server availability, to more complex rules, such as selecting an application server with the lowest server load in order to obtain load balancing among a group of servers.

An advantage over the prior art is that an application server may be selected according to a complex set of predefined rules, taking into account information regarding resource utilization and user properties. Additionally, the terminal is able to make use of a Virtual Private Network (VPN) based connection to connect to the IMS.

In a further aspect of the present invention, a method is provided, wherein at least one of the rules is based on information relating to at least one of: the application server belonging to a group of application servers; policies to be applied in the IMS; the status of an application server; and the network topology of the interconnecting network. In one specific embodiment of the invention, the information comprises status information on the availability of application servers. This prevents the IMS from attempting registration with application servers that are unavailable. In another embodiment, the information comprises load information of an application server. Rules based on the load information will result in the IMS applying load balancing. In a simpler embodiment, load balancing can be done based on the number of users registered with an application server instead of using the actual load of the server.

In a further aspect of the present invention, a method is provided, further comprising: detecting the status of the application server; upon detecting a failed status of the application server, initiating the registration of a terminal registered with the application server, with a second application server, in order for the second application server to take over the services provided by the failed application server to the terminal. In embodiments according to the prior art, a failing application server will result in the application becoming unavailable to the terminal. In order to restore the service to the terminal, the terminal itself needs to initiate re-registering in order to register with a second server, which is available. The present invention allows the IMS to detect an application server becoming unavailable. In such a situation, a specific embodiment of the invention will initiate re-registering of all terminals connected to the first application server with a second, available application server, in order to restore service to the terminals. Where the re-registering of the terminals in the prior art can easily take minutes or even hours, the present invention allows for an almost instantaneous re-registering of the terminals, minimizing the service outage.

In a further aspect of the present invention, a method is provided, wherein the step of selecting the application server is initiated by a Serving-Call Session Control Function (S-CSCF). In a more specific embodiment of the invention, the whole method according to the invention is implemented in a S-CSCF.

In an embodiment of the present invention, an apparatus is provided for registering a terminal with an application server being a member of a pool of available application servers in an IP Multimedia System, IMS, interconnected through a network, for providing services to the terminal, the apparatus comprising: receiving means connectable to the terminal for receiving a registration request from the terminal; selection means for selecting, based on a predefined set of rules comprising at least two rules, an application server for servicing a requested service to the terminal; and register means connected to the selection means and connectable to an application server to send a registration request for the terminal to an application server selected by the selection means.

In a further embodiment, the present invention provides an apparatus, further comprising a storage connected to the selection means, wherein information is stored relating to at least one of: the application server belonging to a group of application servers; policies to be applied in the IMS; the status of an application server; and the network topology of the interconnecting network; and wherein the selection means are arranged to use this information in the rules of the predefined set of rules.

In another embodiment according to the invention, an apparatus is provided, further comprising: detecting means connectable to the interconnecting network for detecting the status of an application server, wherein the selection means are arranged to initiate the selection of a second application server and registration of the terminal with the second application server upon the detecting means detecting a failure of the first application server. In an alternative embodiment, instead of the apparatus comprising the detecting means, the apparatus is connectable to the detecting means.

In a specific further embodiment, the present invention provides an apparatus, comprising a S-CSCF. In one specific embodiment, the S-CSCF is responsible for initiating upon detection of a first application server failing, the re-registration with a second application server of all terminals that were registered with the first application server.

In another embodiment, the present invention provides an IP Multimedia Subsystem comprising at least two application servers for providing a requested service to a terminal, an apparatus according to claim 5, and a network interconnecting the apparatus and the application servers.

Hereinafter additional embodiments and further advantages will be given with reference to the accompanying drawings, wherein.

Figure 1:
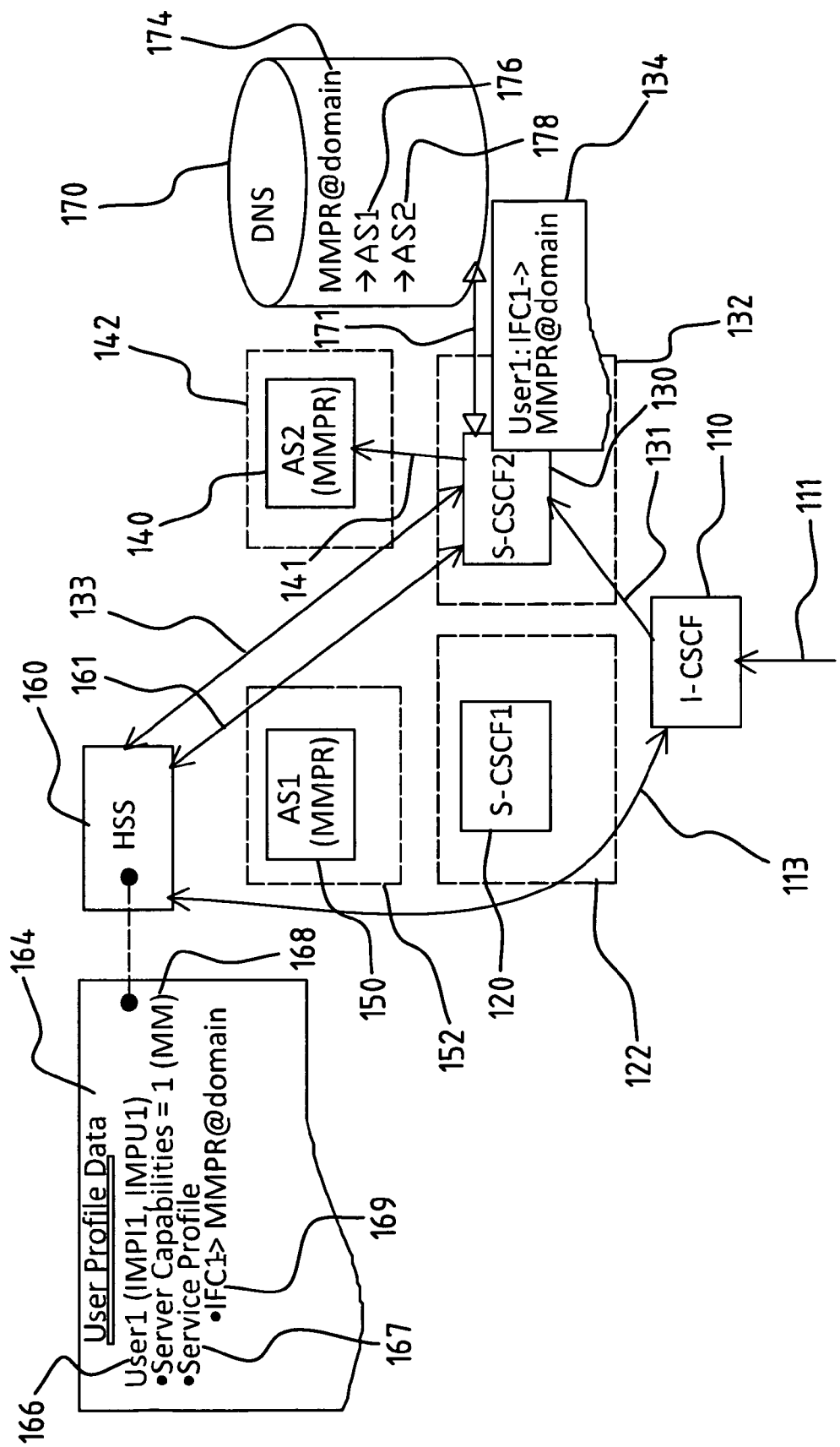
FIG. 1 shows diagrammatically an IMS in accordance with the prior art.

FIG. 1 shows an IMS in accordance with the prior art, comprising an I-CSCF 110, two S-CSCFs 120, 130, respectively located at sites 122 and 132, two application servers 140, 150, respectively located at sites 142 and 152, a DNS database 170, and a HSS 160.

A request for registering a terminal with an application server of the IMS arrives 111 at the I-CSCF 110. The registration request comprises an IP Multimedia Private Identity (IMPI) and an IP Multimedia Public Identity (IMPU) to identify the requesting terminal. The I-CSCF 110 requests 113 validation for the registration request from HSS 160. The validation request includes the IMPI and IMPU. After the HSS 160 validates 113 the registration request, the registration request is forwarded 131 towards an S-CSCF 130. The S-CSCF 130 sends 133 a Multimedia Authentication Request (MAR) to the HSS 160. The HSS 160 responds 133 with a Multimedia Authentication Answer (MAA). Subsequently, the S-CSCF 130 sends 161 a Server Assignment Request (SAR) to the HSS 160 in order to bind the terminal with the S-CSCF 130. The HSS 160 responds 161 with a Server Assignment Answer, comprising the user profile 164, including the URI of the application server to connect to. This URI is stored in a service record 169 of a service profile record 167 of a user profile 164 stored in the HSS 160. The user profile 164 further comprises a user identity record 166 comprising the IMPI and IMPU, and a server capabilities record 168. After the S-CSCF 130 has received the user profile 164, the S-CSCF 130 subsequently queries 171 a DNS-server 170 to obtain the host address of the host specified by the service record 169. The DNS-server 170 comprises an entry 174 for the URI in the service record 169. The entry 174 comprises a host address of an application server 176, 178. The DNS-server 170 returns 171 a valid host address 176, 178 for an application server 140, 150 to the S-CSCF 130. Finally, the S-CSCF 130 forwards 141 the registration request to the application server 140 with the host address 178 provided by the DNS-server 170. After receiving 141 the registration request, the application server 140 registers the terminal. In order to distribute terminals over more than one application server, the prior art implements a more specific DNS-procedure, wherein an entry 174 for a URI contains multiple host addresses 176, 178, and the host address are returned in, for example, a round-robin fashion.

Figure 2:
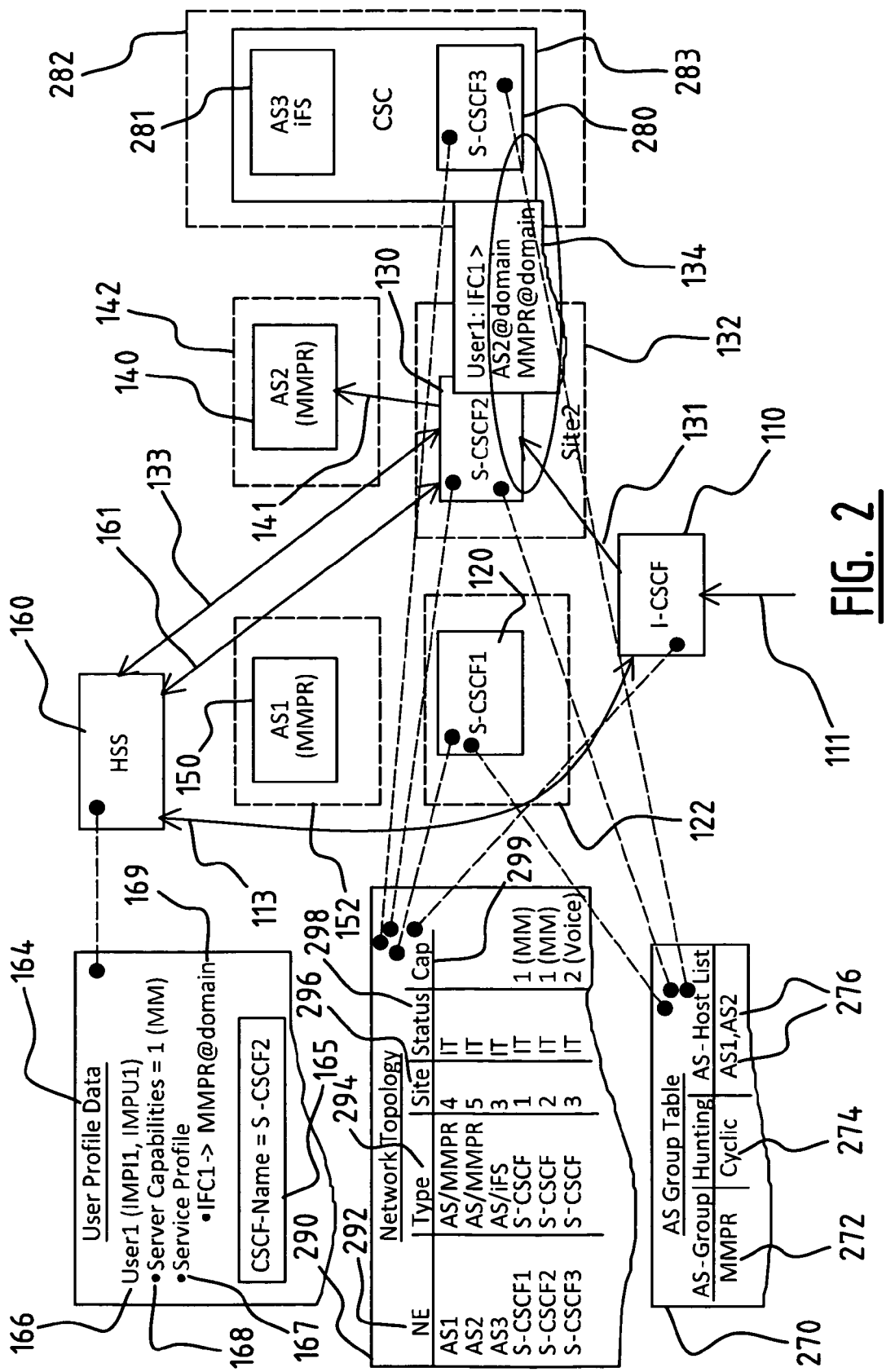
FIG. 2 shows diagrammatically an IMS according to the present invention with a registration sequence according to the present invention.

FIG. 2 shows a preferred embodiment according to the present invention. The dashed lines connect information to systems, and represent to what systems the information is available. Objects correspond to like-numbered objects in FIGS. 1 (and 3). The first part of the registration procedure is equivalent to the procedure in the prior art. The procedure differs from the moment the S-CSCF 130 sends the Multimedia Authentication Request to the HSS 160. In addition to the service record 169, the HSS 160 also returns a definition 165 of the CSCF with the Multimedia Authentication Answer. Now, the S-CSCF 130 has access to an Application Server group table (AS group table) 270. The AS group table lists what application servers 140, 150 are a member 274 of the AS group 272 defined in the service record 169 that is obtained from the HSS 160. The AS group table 270 also contains a specification of a hunting algorithm 274 for selecting an application server 140, 150 from the list of application servers in an AS group 272. This hunting algorithm 274 is used, for example, for load balancing. Additionally, a weight factor can be used to account for differing performance rates of the application servers 140, 150, due to differing hardware and software configurations. In the example shown, the hunting algorithm 274 is a cyclic algorithm, which determines that the application servers 140, 150 in the AS group 272 are returned cyclically. The S-CSCF 130 obtains a host address 276 from the AS group table 270 in accordance with the hunting algorithm 274. Subsequently, a network topology table 290 is checked to ensure the application server 140, 150 corresponding to the obtained host address is actually available. For this purpose the status column 298 in the table 290 is checked. Furthermore, the network topology table 290 contains further information, such as the site 296 where an application server 140, 150 is located. Now that a host address has been obtained for an available application server 140, the registration request is forwarded 141 to the application server 140.

Figure 3:
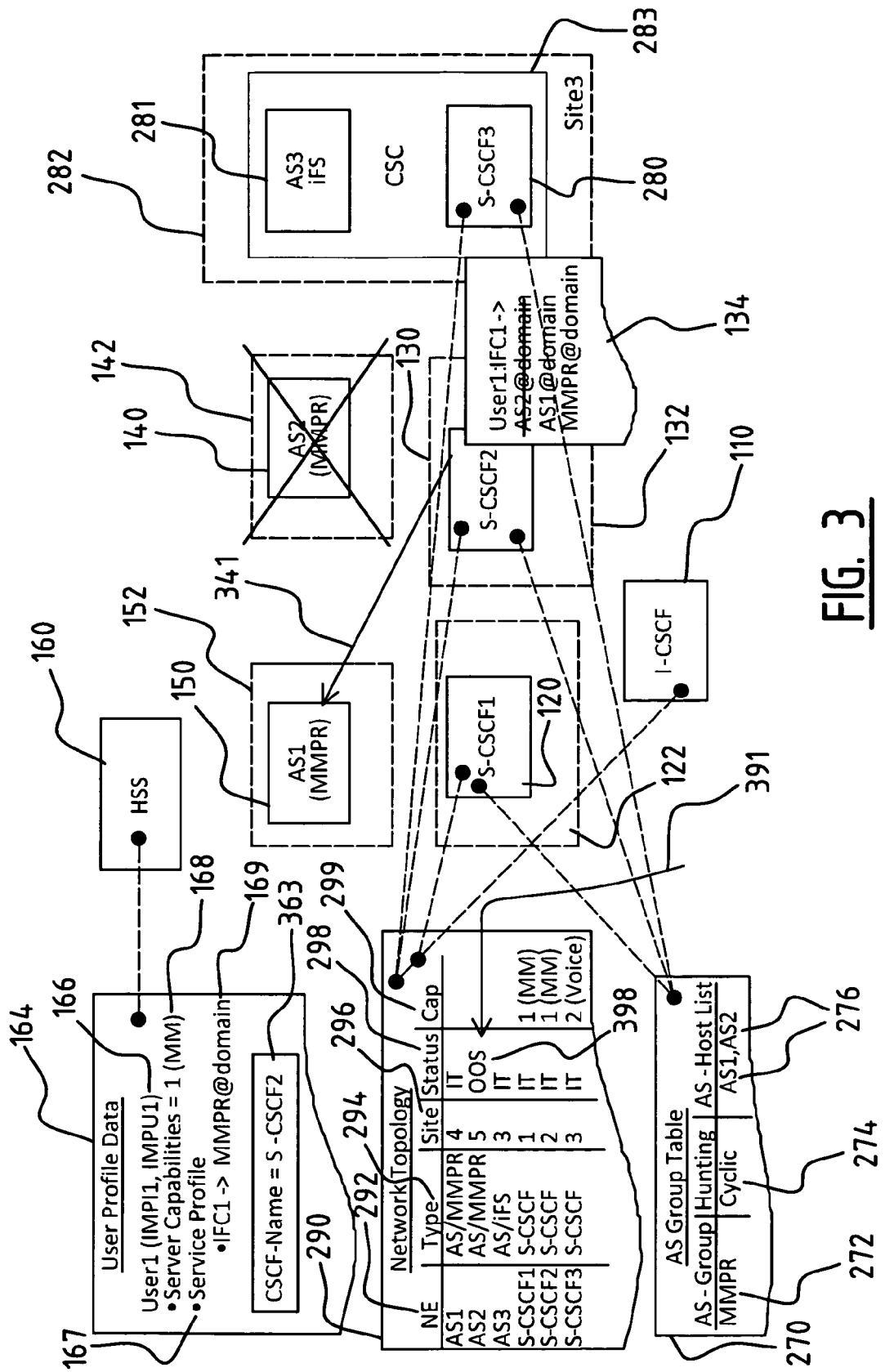
FIG. 3 shows diagrammatically the IMS of FIG. 2 with the re-registration sequence according to the present invention.

Assume now that application server 140 becomes unavailable (FIG. 3). This is flagged in the network topology table 290 by the status of AS2 140 changing to OOS (Out-of-service) 398. Based on the network topology table 290, the S-CSCF 130 will detect that application server 140 has become unavailable. In its registration table, it will look up all terminals connected to application server 140. For each terminal connected to application server 140, it will consult the AS group table 270 to find a host address 276 of an alternative application server 150. The network topology table 290 is checked again to ensure the alternative application server 150 is available. If the alternative application server 150 is available, the S-CSCF 130 re-registers the terminal with the alternative application server 150 by sending 341 a registration request to the alternative application server 150. This results in all terminals being re-registered to a new application server 150, without the terminals themselves being required to detect the service interruption and initiate the re-registration themselves.

It should be noted that the embodiments provided in the description above are only exemplary. It is clear to the man skilled in the art that numerous modifications and adaptations are possible within the scope of the present invention. The scope of protection sought is therefore determined by the following claims.

The invention claimed is:

1. A method for registering a terminal with an application server being a member of a pool of available application servers in an IP Multimedia Subsystem (IMS), interconnected through a network, for providing services to the terminal, the method comprising:
- receiving, by a call session controller, a registration request from the terminal;
- selecting, by the call session controller, the application server for providing services to the terminal in accordance with a hunting algorithm, the hunting algorithm including at least a cyclic algorithm for determining application servers from the pool of available application servers that are returned cyclically;
- registering, by the call session controller, the terminal with the selected application server;
- detecting, by the call session controller, a status of the selected application server; and
- re-registering, by the call session controller, the terminal with a second application server, upon detecting a failed status of the selected application server, in order for the second application server to take over the services provided by the selected application server to the terminal.

2. A method according to claim 1, wherein the selecting the application server for providing the services to the terminal is further based on at least two rules, the at least two rules being based on information relating to at least two of:
- the application server belonging to a group of application servers;
- policies to be applied in the IMS;
- the status of an application server; and
- a network topology of the interconnecting network.

3. An apparatus for registering a terminal with an application server being a member of a pool of available application servers in an IP Multimedia Subsystem (IMS), interconnected through a network, for providing services to the terminal, the apparatus comprising:
- a call session controller configured to,
  - receive a registration request from the terminal,
  - select, according to a hunting algorithm, the application server providing services to the terminal, the hunting algorithm including at least a cyclic algorithm for determining application servers from the pool of available application servers that are returned cyclically,
  - send a registration request for the terminal to the selected application server,
  - detect status of the selected application server, and
  - re-register the terminal with a second application server, upon detection of a failed status of the selected application server, in order for the second application server to take over the services provided by the selected application server to the terminal.

4. The apparatus according to claim 3, further comprising:
- a storage connected to the call session controller, wherein information is stored relating to at least one of:
- the application server belonging to a group of application servers;
- policies to be applied in the IMS;
- the status of an application server; and
- a network topology of the interconnecting network; and
- wherein the call session controller is further configured to select the application server based on at least two rules corresponding to the information.

5. An IP Multimedia Subsystem comprising:
- at least two application servers for providing a requested service to a terminal,
- an apparatus according to claim 3, and
- a network interconnecting the apparatus and the application servers.

6. The method of claim 1, wherein the hunting algorithm performs a load balancing.

7. The apparatus of claim 3, wherein the hunting algorithm performs a load balancing.

* * * * *